(12) United States Patent
Shen et al.

(10) Patent No.: US 6,377,627 B1
(45) Date of Patent: Apr. 23, 2002

(54) METHOD AND APPARATUS FOR DECODING MPEG VIDEO DATA

(75) Inventors: Wei-Le Shen, Santa Clara; Ching-Fang Chang, San Jose, both of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/387,057

(22) Filed: Aug. 31, 1999

(51) Int. Cl.$^7$ ................................................. H04N 7/12
(52) U.S. Cl. .................................................... 375/240.2
(58) Field of Search .................... 375/240.01, 240.18, 375/240.24, 240.2, 240.25, 240.26; H04N 7/12

(56) References Cited

U.S. PATENT DOCUMENTS 5,825,420 A 10/1998 Yang et al. .................. 348/403

FOREIGN PATENT DOCUMENTS

| EP | 0 674 447 | 9/1995 | ............ H04N/7/50 |
| EP | 0 903 944 | 3/1999 | ............ H04N/7/30 |

Primary Examiner—Young Lee

(74) Attorney, Agent, or Firm—Skjerven Morrill MacPherson LLP; David W. Heid; Fabio E. Marino

(57) ABSTRACT

An MPEG video decoder adapted to decode an incoming MPEG coded video data stream to form decoded MPEG video data and to reconstruct from the decoded MPEG video data a raw video signal, utilizes: an n×n block of decoded video data discrete cosine transform values forming an original matrix having a non-zero value in a preselected corner location in the matrix; and a modified matrix forming apparatus adapted to form a modified matrix having the same content as the original matrix with the exception of a zero in the preselected corner value position; a dummy matrix forming apparatus adapted to form a dummy matrix having zero in each of its matrix positions with the exception of the preselected corner position; an inverse discrete cosine transform apparatus adapted to perform an inverse discrete cosine transform algorithm on the modified matrix and the dummy matrix; and an adder which adds the inverse discrete cosine transform of the modified matrix and the dummy matrix to produce the inverse discrete cosine transform for the original matrix. The matrix may be the typical 8x8 MPEG block. The inverse discrete cosine transform for the dummy matrix may be precomputed and stored and added to each inverse discrete cosine transform of each modified matrix.

24 Claims, 1 Drawing Sheet

METHOD AND APPARATUS FOR DECODING MPEG VIDEO DATA

FIELD OF THE INVENTION

The present invention relates to MPEG video data decoders and specifically to a method and apparatus for improving the performance of MPEG video data decoders.

BACKGROUND OF THE INVENTION

MPEG, which stands for Moving Pictures Experts Group, is a standard for compression of video and audio for broadcast video/audio and compact discs. MPEG (video and audio systems) is the exclusive syntax of the United States Grand Alliance HDTV specification, the European Digital Video Broadcasting Group, and the high density compact discs. MPEG-1 and MPEG-2 are well known and documented and referred to respectively as ISO/IEC 11172 Information Technology Coding of Moving Pictures and Associated Audio for Digital Storage Media at up to about 1.5 Mbits/s, 1993 and ISO/IEC 13818 Information Technology—Generic Coding of Moving Pictures and Associated Audio, the disclosures of which are hereby incorporated by reference.

In accordance with the standard, MPEG video provides an efficient way to represent image sequences in the form of more compactly coded data. MPEG also describes a decoding (reconstruction) process whereby coded bits in a transmitted MPEG video bit stream are mapped from the compressed representation into the original raw video signal data format of the image sequence suitable for driving a video display. For example, a flag in the coded bit stream signals whether the following bits are to be decoded with purely a discrete cosine transform (DCT) algorithm or with a prediction algorithm. The header also contains information needed to apply the prediction in algorithm followed by a DCT algorithm. The algorithms comprising the decoding process are regulated by MPEG. MPEG can be applied to exploit common video characteristics such as spatial redundancy, temporal redundancy, uniform motion, spatial masking.

MPEG encodes a video sequence (possible decimated from the original) of, e.g. 720 by 480 pixel frames by 30 frames/s. The images are in color, but are converted to the YUV space, and the two chrominance channels (U and V) are decimated further to 360 by 240 pixels. A coarser resolution in the chrominance channels is acceptable within the bounds of human perception in the decoded reconstructed raw video signal data, at least for "natural" (not computer generated) images. The basic scheme of MPEG is to predict motion from frame to frame in the temporal direction, and then to use discrete cosine transforms, "DCTs" to organize the redundancy in the spatial directions. The DCT's are done on 8×8 blocks, and the motion prediction is done in the luminance (Y) channel on 16x16 blocks, together forming a so-called macroblock.

The encoded data is organized into a video sequence, which consists of a series of Groups of Pictures, each of some finite length. Each picture is broken down into the a series of slices. Each slice is comprised of a series of adjacent macroblocks. Each macroblock consists of four adjacent 8×8 blocks of data each representing one of four picture element ("pel") values for the Y (luminescence) portion of the video signal (each of the four related to a pixel in the television screen, for example). In addition there are two 8×8 blocks of data, one each for the chrominance values Cb and Cr. Each of the chrominance values is associated with the each of the four Y luminescence values, which relatively are associated with one of the four pixels forming the pel. The six 8×8 blocks of data, therefore, constitute a macroblock. The decoding process utilizes, respectively, frame and filed Inverse Discrete Cosine Transforms ("IDCTs") to decode the respective frame and field Discrete Cosine Transforms ("DCTs") and convert the encoded video signal from the frequency mode to the spatial mode in order to produce the reconstruction raw video signal data.

The DCT coefficients (of either the actual data, or the difference between the block being decoded/reconstructed and another closely matching block from another frame) are "quantized", to form variations around a much shorter average value. The quantization can change for every "macroblock," i.e., for each 16x16 block (four 8×8 blocks) of Y and the corresponding two 8×8 blocks for the U(Cb) and V(Cr) for example the quantized values can be 8, 9, 10 or 11 bits in length. The result of all of this, which includes DCT coefficients, motion vectors, and quantization parameters (among other elements) is modified-Huffman coded using fixed tables. The DCT coefficients have a special Huffman table that is "two-dimensional." One code specifies a run-length of zeros and a non-zero value at the end of the run. Motion vectors and the DC DCT components are differential pulse code modulation ("DPCM") coded.

Video decoders/reconstructors are known in the art. It is known in the art for such video decoders/reconstructors to have a separate co-processor for doing variable length decoding of the MPEG video data input bit stream, along with a core processor, which does the reconstruction of the decoded MPEG video data into raw video signal data. The reconstructed video signal may be provided to an external device including another host computer or a video player for display.

The speed of processing a macroblock is determined by the amount of data in the macroblock, the speed of the variable length decoder, the speed of the processes performed in doing the reconstruction by the core processor (i.e., among other things, the algorithm used to do the Inverse Discrete Cosine Transformations ["IDCTs"] on the DCTs) and the speed of data transfer between the two. For block by block decoding a familiar algorithm involves a two-dimensional IDCT for the 8×8 block which is performed as eight one dimensional IDCTs ("row operations"), one for each of the eight rows followed by eight one dimensional IDCTs ("column operations") with the result being the IDCT values for each location in the 8×8 block of reconstructed video signal data. A typical algorithm for performing each of the one dimensional row operations or column operations requires 29 additions and 11 multiplications. In some MPEG decoders special purpose microprocessors, referred to as Digital Signal Processors ("DSPs"), are equipped with special purpose circuitry, e.g., for doing multiplies and/or divides in specially dedicated hardware (along with the usual arithmetic and logic units that a microprocessor normally possesses). However, for performing MPEG decoding/reconstruction on a general purpose microprocessor/microcontroller and/or using a general purpose microprocessor/microcontroller as a co-processor with, e.g., a VLD co-processor, there exists a need to streamline the processing of the MPEG reconstruction algorithm. One way of reducing the calculations that takes advantage of the MPEG decoded video data structure is the fact that for a row or column that is all zeros, the IDCT output is also all zeros. MPEG encoding is designed to induce as many zero values into the positions within a block of decoded video data as possible. However, one aspect of MPEG encoding tends to eliminate the advantage of the tendency toward having zero DCTs in much of the decoded video data in each block.

For the purpose of so-called "mismatch control", MPEG encoding adjusts the encoded value of the last column's last row last column ($C_{(7,7)}$) DCT value depending upon the overall "oddness" of the whole block. In this way, the $C_{(7,7)}$ position in each block is, on average, a one or is converted from a zero value to a one. In this event, the row operation on the bottom (7th) row will produce all non-zero values. Therefore, none of the subsequent column operations can take advantage of the "all-zeroes" phenomenon, and all will require the full application of the IDCT algorithm, e.g., the 40 computations noted above. There exists in the art, therefore, a need for a more effective and efficient reconstruction algorithm for transforming the decoded video data DCT components into reconstructed raw video signal data with a microprocessor/microcontroller acting as the core processor (or acting concurrently as the VLD co-processor and the core processor). The overall speed of decoding and reconstruction can thus be enhanced.

SUMMARY OF THE INVENTION

The present invention utilizes the linear nature of the matrix processing involved in processing an 8×8 block of decoded video data to eliminate the detrimental effect of having non-zero data in the $C_{(7,7)}$ location in a large number of decoded blocks of MPEG decoded video data (DCTs). A dummy matrix is constructed according to whether the matrix contains a non-zero value in the $C_{(7,7)}$ position. The dummy matrix is populated in all block locations with zeroes except for a one in the $C_{(7,7)}$ position. The original matrix having the non-zero value in the $C_{(7,7)}$ position is modified to have a zero in the $C_{(7,7)}$ position. The IDCTs are performed on the modified original matrix, with the bottom row possibly being all zeroes. In the event that it is all zeroes, it does not require any IDCTs to be performed and the transformation of the entire row is also all zeroes. Also, the removal of the one from the $C_{(7,7)}$ position eliminates a transformation that will prevent the column DCTs, or some of them, from being all zeroes, thus allowing for there to be column operations that are in respect to all zero one dimensional columns. For such columns, this eliminates the need to do IDCTs for that column. The dummy matrix, which always remains the same, can be precalculated and stored. The output of the performance of IDCTs on the modified original matrix and the stored result of the IDCTs being performed on the dummy matrix are summed. The sum is the resultant IDCTs for the original unmodified matrix forming the 8×8 block.

DETAILED DESCRIPTION OF THE PREFERRED EMBODIMENTS

Figure 1:
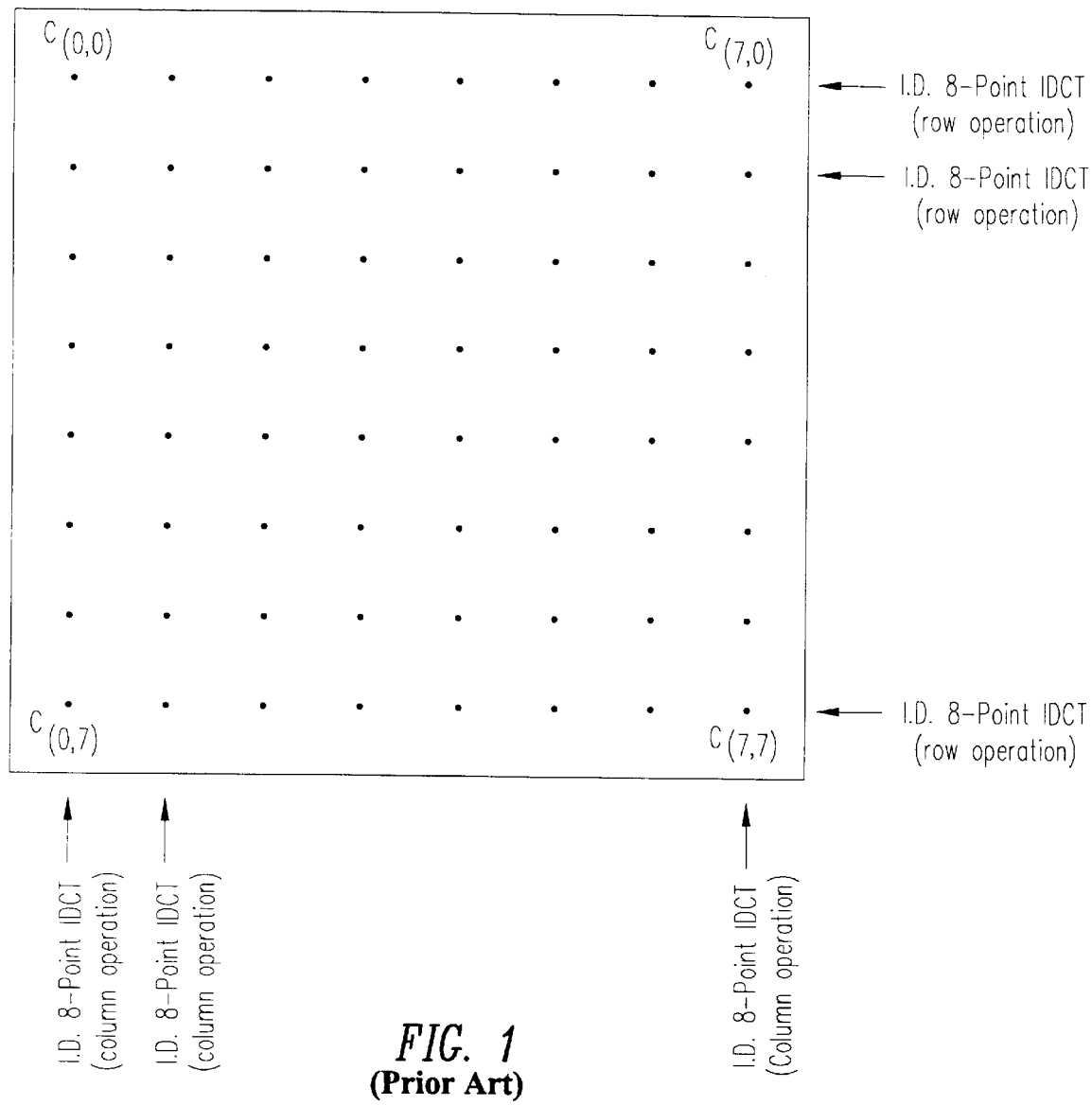
FIG. 1 is a representation of an 8×8 block of decoded MPEG video data (DCTs) for a block of MPEG decoded video data.

Turning now to FIG. 1 there is shown the representation of an 8×8 block of decoded MPEG compressed video data that has been decoded by a variable length decoder from an incoming MPEG bit stream, as is well known in the art. The block of data includes an 8×8 matrix is decoded discrete cosine transforms (DCTs) for Luminance or Chrominance in the MPEG block format. The core processor then converts the DCTs by performing Inverse Discrete Cosine Transforms (IDCTs) on the DCTs, as is also well known in the art. The first or top row contains matrix positions $C_{(0,0)}$ . . . $C_{(0,7)}$. The rows vary from $C_{(0,0)}$ to $C_{(7,0)}$ with the last or bottom row having the $C_{(7,0)}$ . . . $C_{(7,7)}$ positions. In performing the IDCTs on the DCTs in each of the positions in the 8×8 matrix, as is well known in the art, the core processor does eight separate one-dimensional IDCTs, on each of the rows initiating with $C_{(0,0)}$ through $C_{(0,7)}$. As mentioned above, in the known art a significant number, about one half on average, of these 8×8 matrices will have a non-zero value in the $C_{(7,7)}$. Performing the IDCT on this last row with a one in the $C_{(7,7)}$ position results in transformation of the entire row to non-zero values. This in turn prevents any of the columns $C_{(0,0)}$ through $C_{(7,0)}$ from having all zeroes, regardless of the remainder of their content, and, therefore eliminates the ability to avoid IDCT transformations for columns of all zeroes.

Figure 2:
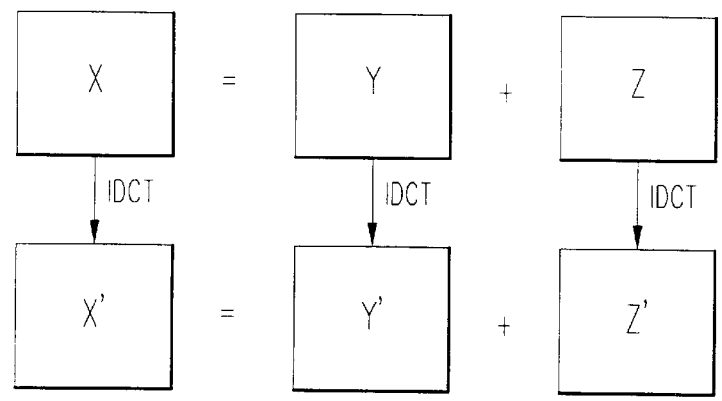
FIG. 2 is a diagrammatic representation of the IDCT processing according to the present invention.

FIG. 2 illustrates diagramatically the present solution to this problem of existing MPEG coders and decoders. According to the present invention, whenever the original 8×8 block matrix X of decoded MPEG video data (DCTs) $C_{(0,0)}$ through $C_{(7,7)}$ contains a non-zero value in the $C_{(7,7)}$ position, whether due to modification for the purpose of mismatch control, or not, the $C_{(7,7)}$ position is converted to a zero to form a modified 8×8 matrix block Y. The IDCTs are then done on the modified block Y to form a transformed block Y'. A dummy matrix Z is also created (or precomputed as noted below) which contains zeroes in all of the positions except the $C_{(7,7)}$ position, which was modified as noted above in the original block to form the modified block. The IDCTs are done on this dummy block Z to form the transformed block Z'. Since Z will always be the same, all zeroes except for the modified matrix location, the result of the matrix IDCT transformation on such a block can be precalculated and stored in memory.

According to the linear properties of IDCT transformations, the transformation for the matrix X, i.e., X' is equal to Y'+Z'. The result requires the addition of Y' or Z' after IDCTs are performed on Y (and the values for Z' are recalled from memory). However, the number of computations that the core processor will have to perform will overall be reduced by improving the zero patterns in a majority of the blocks processed, by insuring a string of zeroes in the bottom row of each decoded DCT modified matrix Y.

It will be understood by those skilled in the art that the present invention has been described in relation to a preferred embodiment and the invention is not limited only to that preferred embodiment. Many changes and modifications within the substance and spirit of the invention will be understood by those skilled in the art to be within the scope and meaning of the appended claims. For example, subsequent versions of MPEG may call for forced setting of bits in the matrix for other reasons than mismatch control and/or in other than the location $C_{(7,7)}$, which may have the same or even heightened detrimental effect on the desire to keep as many rows and columns free of non-zero entries as possible. In addition, the IDCT may be performed by column operations first followed by row operations. Therefore, a dummy matrix according to the present invention may be formed with the modification of other than the $C_{(7,7)}$ or including other positions as well. A plurality of dummy matrices may be required, one for each so modified position in the original matrix.

We claim:

1. An MPEG video decoder adapted to decode an incoming MPEG coded video data stream to form decoded MPEG video data and to reconstruct from the decoded MPEG video data a raw video signal, wherein the decoded video data is in the form of an n×n block of decoded video data discrete cosine transform values forming an original matrix having a non-zero value in a preselected corner position in the matrix, comprising:

a modified matrix forming apparatus adapted to form a modified matrix having the same content as the original matrix with the exception of a zero in the preselected corner value position;

a dummy matrix forming apparatus adapted to form a dummy matrix having zero in each of its matrix positions with the exception of the preselected corner position;

an inverse discrete cosine transform apparatus adapted to perform an inverse discrete cosine transform algorithm on the modified matrix and the dummy matrix; and an adder which adds the inverse discrete cosine transform of the modified matrix and the dummy matrix to produce the inverse discrete cosine transform for the original matrix.

2. The apparatus of claim 1 wherein the n×n matrix is an 8×8 matrix.

3. The apparatus of claim 2 wherein the inverse cosine transform algorithm comprises a plurality of n one dimensional row operations followed by a plurality of n one dimensional column operations.

4. The apparatus of claim 3 wherein the preselected corner position is selected to be the nth position in the nth row.

5. The apparatus of claim 1 wherein the inverse cosine transform algorithm comprises a plurality of n one dimensional row operations followed by a plurality of n one dimensional column operations.

6. The apparatus of claim 5 wherein the preselected corner position is selected to be the nth position in the nth row.

7. The apparatus of claim 1 wherein the preselected corner position is selected to avoid an inverse discrete cosine transformation, consisting of a one-dimensional row operation on the row in which the corner position is present, resulting in all non-zero values in the row in which the corner is present, prior to a subsequent one dimensional column operation being performed on each of the columns.

8. The apparatus of claim 1 wherein the inverse discrete transform apparatus further comprises a precomputing apparatus adapted to precompute and store the results of an inverse discrete cosine transform of the dummy matrix and to provide these results to the adder for adding to each inverse discrete cosine transform of each modified matrix.

9. An MPEG video decoding means for decoding an incoming MPEG coded video data stream in order to form decoded MPEG video data and for reconstructing from the decoded MPEG video data a raw video signal, comprising:

means for forming the decoded MPEG video data into an n×n block of discrete cosine transform values forming an original matrix having a non-zero value in preselected corner position in the matrix;

a modified matrix forming means for forming a modified matrix having the same content as the original matrix with the exception of a zero in the preselected corner value position;

a dummy matrix forming means for forming a dummy matrix having zero in each of its matrix positions with the exception of the preselected corner position;

an inverse discrete cosine transform means for performing an inverse discrete cosine transform algorithm on the modified matrix and the dummy matrix; and an adder which adds the inverse discrete cosine transform of the modified matrix and the dummy matrix to produce the inverse discrete cosine transform for the original matrix.

10. The apparatus of claim 9 wherein the n×n matrix is an 8×8 matrix.

11. The apparatus of claim 10 wherein the inverse cosine transform algorithm comprises a plurality of n one dimensional row operations followed by a plurality of n one dimensional column operations.

12. The apparatus of claim 11 wherein the preselected corner position is selected to be the nth position in the nth row.

13. The apparatus of claim 9 wherein the inverse cosine transform algorithm comprises a plurality of n one dimensional row operations followed by a plurality of n one dimensional column operations.

14. The apparatus of claim 13 wherein the preselected corner position is selected to be the nth position in the nth row.

15. The apparatus of claim 9 wherein the preselected corner position is selected to avoid an inverse discrete cosine transformation, consisting of a one-dimensional row operation on the row in which the corner position is present, resulting in all non-zero values in the row in which the corner is present, prior to a subsequent one dimensional column operation being performed on each of the columns.

16. The apparatus of claim 9 wherein the inverse discrete transform means further comprises a precomputing apparatus for precomputing and storing the results of an inverse discrete cosine transform of the dummy matrix and for providing these results to the adder for adding to each inverse discrete cosine transform of each modified matrix.

17. A method for decoding an incoming MPEG coded video data stream to form decoded MPEG video data in the form of discrete cosine transforms and to reconstruct from the decoded MPEG video data a raw video signal, comprising:

forming an n×n block of decoded video data discrete cosine transform values into an original matrix having a non-zero value in a preselected corner position in the matrix;

forming a modified matrix having the same content as the original matrix with the exception of a zero in the preselected corner value position;

forming a dummy matrix having zero in each of its matrix positions with the exception of the preselected corner position;

performing inverse discrete cosine transforms on the modified matrix and the dummy matrix; and adding the inverse discrete cosine transform of the modified matrix and the dummy matrix to produce the inverse discrete cosine transform for the original matrix.

18. The method of claim 17 wherein the n×n matrix is an 8×8 matrix.

19. The method of claim 18 wherein the inverse cosine transform algorithm comprises a plurality of n one dimensional row operations followed by a plurality of n one dimensional column operations.

20. The method of claim 19 wherein the preselected corner position is selected to be the last position in the last nth row.

21. The method of claim 17 wherein the inverse cosine transform algorithm comprises a plurality of n one dimensional row operations followed by a plurality of n one dimensional column operations.

22. The method of claim 21 wherein the preselected corner position is selected to be the last position in the last nth row.

23. The method of claim 17 wherein the preselected corner position is selected so as to avoid an inverse discrete cosine transformation, consisting of a one-dimensional row operation on the row in which the corner position is present, which results in all non-zero values in the row in which the corner is present, prior to a subsequent one dimensional column operation being performed on each of the columns.

24. The method of claim 17 wherein the step of performing inverse discrete cosine transforms further comprises precomputing and storing the results of an inverse discrete cosine transform of the dummy matrix and providing these results to the adder for adding to each inverse discrete cosine transform of each modified matrix.

* * * * *